US 12,019,765 B2

(12) United States Patent
Wenger

(10) Patent No.: US 12,019,765 B2
(45) Date of Patent: *Jun. 25, 2024

(54) CRYPTOGRAPHIC PROCESSING DEVICE AND METHOD FOR CRYPTOGRAPHICALLY PROCESSING DATA

(71) Applicant: Infineon Technologies AG, Neubiberg (DE)

(72) Inventor: Erich Wenger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 295 days.

This patent is subject to a terminal disclaimer.

(21) Appl. No.: 17/548,626

(22) Filed: Dec. 13, 2021

(65) Prior Publication Data

US 2022/0188427 A1 Jun. 16, 2022

(30) Foreign Application Priority Data

Dec. 14, 2020 (DE) .......................... 102020133312.9

(51) Int. Cl.
*G06F 21/60* (2013.01)
*G06F 7/544* (2006.01)

(52) U.S. Cl.
CPC .......... *G06F 21/602* (2013.01); *G06F 7/5443* (2013.01)

(58) Field of Classification Search
CPC .............................. G06F 21/607; G06F 7/5443
USPC ......................................................... 713/189
See application file for complete search history.

(56) References Cited

U.S. PATENT DOCUMENTS

| 7,046,800 | B1 | 5/2006 | Tenca et al. | |
|---|---|---|---|---|
| 7,401,109 | B2 | 7/2008 | Koc et al. | |
| 7,764,785 | B2* | 7/2010 | Al-Khoraidly | G06F 7/725 713/168 |
| 8,213,606 | B2* | 7/2012 | Shantz | G06F 9/30101 380/44 |
| 8,381,154 | B2* | 2/2013 | Drane | G06F 30/39 716/110 |
| 8,433,744 | B1* | 4/2013 | Harding | G06F 7/5443 708/620 |
| 8,484,267 | B1* | 7/2013 | Szedo | G06F 7/5443 704/224 |
| 2003/0084309 | A1* | 5/2003 | Kohn | G06F 21/72 712/E9.067 |

(Continued)

OTHER PUBLICATIONS

Office Action issued for the corresponding German Patent Application No. 10 2020 133 312.9, dated Oct. 14, 2021, 11 pages (for reference purposes only).

*Primary Examiner* — Amare F Tabor
(74) *Attorney, Agent, or Firm* — Viering, Jentschura & Partner mbB; Benjamin L. von Rueden

(57) ABSTRACT

According to an embodiment, a cryptographic processing device is described comprising a memory configured to store a first operand and a second operand and a cryptographic processor configured to determine, for cryptographically processing the data, the product of the first operand with the second operand by determining, for each result word index in a result word index range, a result data word for the result word index by accumulating products of sums of words of the first operand and the second operand and subtracting excess terms.

14 Claims, 7 Drawing Sheets

(56) References Cited

U.S. PATENT DOCUMENTS

| | | | | |
|---|---|---|---|---|
| 2004/0039928 A1* | 2/2004 | Elbe | ............................ | G06F 7/72 |
| | | | | 713/189 |
| 2004/0167954 A1* | 8/2004 | Griessing | .............. | G06F 7/5443 |
| | | | | 708/552 |
| 2008/0208940 A1* | 8/2008 | Furukawa | ............. | G06F 7/5443 |
| | | | | 708/620 |
| 2009/0132625 A1* | 5/2009 | Stanton | ................. | G06F 7/5443 |
| | | | | 708/306 |
| 2016/0171252 A1* | 6/2016 | Leiserson | ................ | G09C 1/00 |
| | | | | 713/193 |
| 2018/0357043 A1* | 12/2018 | Alsup | .................... | G06F 7/5443 |
| 2019/0044718 A1* | 2/2019 | Ghosh | .................... | G06F 7/5443 |

\* cited by examiner

CRYPTOGRAPHIC PROCESSING DEVICE AND METHOD FOR CRYPTOGRAPHICALLY PROCESSING DATA

CROSS-REFERENCE TO RELATED APPLICATIONS

This application claims priority to German Patent Application DE 10 2020 133 312.9, which was filed on Dec. 14, 2020, the entire contents of which are incorporated herein by reference.

TECHNICAL FIELD

The present disclosure relates to cryptographic processing devices and methods for cryptographically processing data.

BACKGROUND

In cryptographic processing of data, such as calculation of a signature, encryption or decryption of data, the multiplication and addition of large integers are typical operations, which are to be carried out a high number of times. This is in particular the case in asymmetric cryptography based on ECC (elliptic curve cryptography) or RSA (Rivest, Shamir, Adleman). Therefore, especially the multiplication, with its quadratic complexity, usually defines the majority of the runtime of the cryptographic processing of data. Accordingly, approaches for optimizing the multiplication of large integers is desirable for cryptographic processing performance.

BRIEF DESCRIPTION OF THE FIGURES

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

According to various embodiments, a cryptographic processing device is provided including a memory configured to store a first operand and a second operand represented by data to be cryptographically processed, wherein the first operand and the second operand each include a data word for each operand word index in an operand word index range and a cryptographic processor configured to determine, for cryptographically processing the data, the product of the first operand with the second operand by determining, for each result word index in a result word index range, a result data word for the result word index by accumulating, over all pairs of a first operand word index and a second operand word index with the first operand word index being bigger than the second operand word index and the sum of the first operand word index and the second operand word index being equal to the result word index the products of the sum of the word of the first operand for the first operand word index and the word of the first operand for the second operand word index with the sum of the word of the second operand for the first operand word index and the word of the second operand for the second operand word index, adding, if the result word index is even two times the product of the word of the first operand having the operand word index equal to half the result word index and the word of the second operand having the operand word index equal to half the result word index, if there is a positive carry from a result data word of a lower index than the result word index to the result data word, adding the carry, if there is a negative carry from a result data word of a lower index than the result word index to the result data word, subtracting the carry and subtracting, for each first operand word index occurring in the pairs over which the cryptographic processor performs the accumulation for the result word index, the product of the first operand word with the first operand word index and the second operand word with the first operand word index.

According to a further embodiment, a method for cryptographically processing data according to the above cryptographic processing device is provided.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
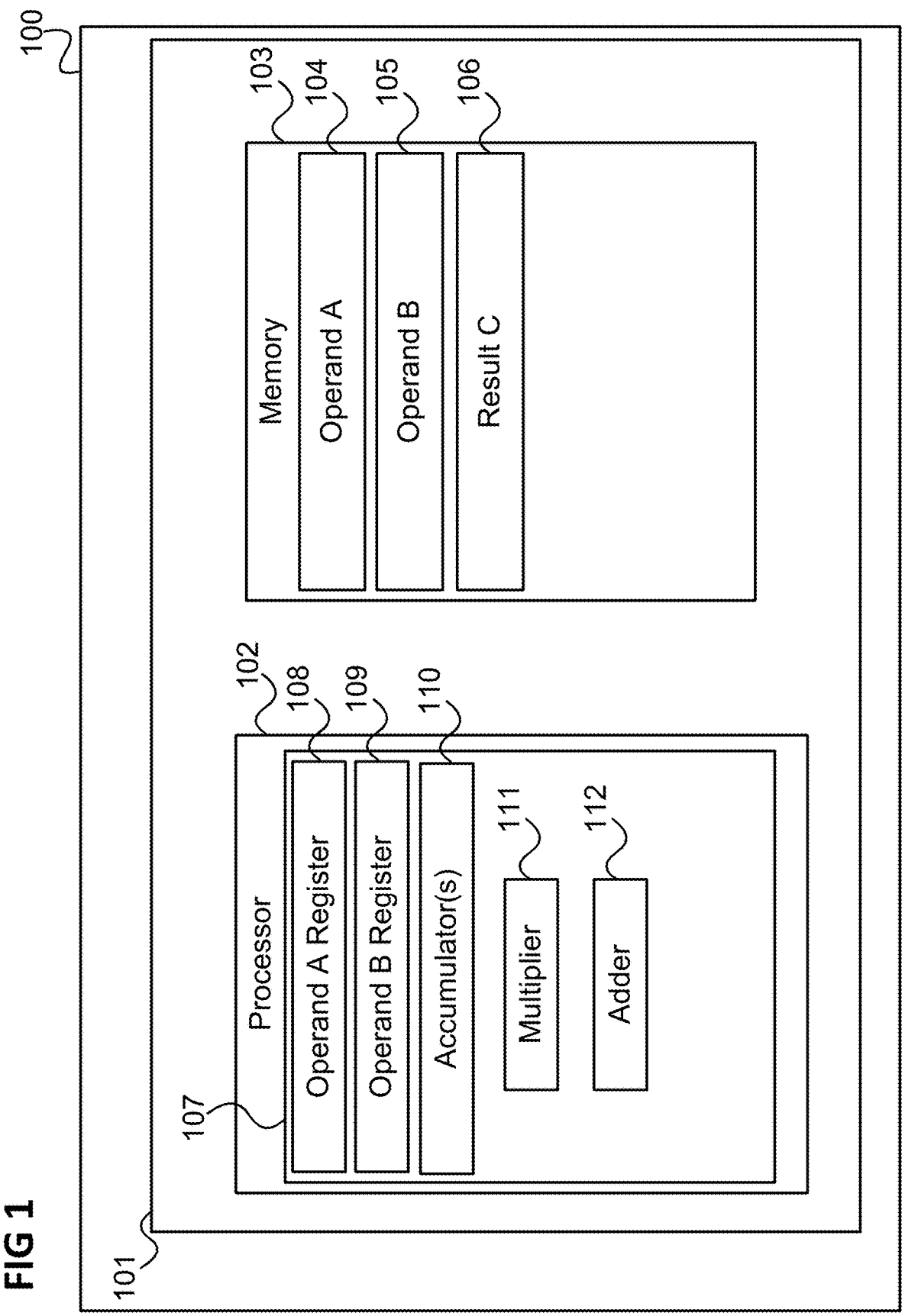
FIG. 1 shows an example of a data processing device.

FIG. 1 shows an example of a data processing device 100.

The data processing device 100 may be a computer, or a controller or a microcontroller, e.g. in a vehicle, e.g. an ECU (Electronic Control Unit) in a car. It may also be a chip card integrated circuit (IC) of a smart card such as a smart card of any form factor, e.g. for a passport or for a SIM (Subscriber Identity Module).

The data processing device 100 has an integrated circuit in the form of a chip 101. The chip 101 may be a control chip and implement a processor 102 and a memory 103, e.g. a RAM (Random Access Memory). It should be noted that the processor 102 and the memory 103 may also be implemented on separate chips. The chip 101 may also be, for example, an RFID (Radio Frequency Identification) chip or implement a SIM (Subscriber Identity Module) for a mobile phone. The chip 101 may be provided for a security application, i.e. may be a security chip. For example, the memory 103 stores secret data used for a cryptographic operation, e.g. to authenticate a user or to encrypt/decrypt or to sign data, for example according to an asymmetric cryptography scheme. Accordingly, the data processing device may be a cryptographic processing device, i.e. a device that performs cryptographic processing of data.

Asymmetric cryptography based on ECC (elliptic curve cryptography) or RSA (Rivest, Shamir, Adleman) requires the addition and multiplication of long integers (typically with a length of 256 bits to 4096 bits). Also, e.g., the isogeny-based post-quantum algorithm SIKE requires the same. Especially the multiplication, with its quadratic complexity, usually defines the majority of the runtime of those applications. To compute these algorithms efficiently on a processor 102 (or coprocessor), the long integers may be split into words of 32 bit or 64 bit length. A hardware implementation may follow a similar approach.

In the following, examples are described in which two operands A and B, stored in arrays 104, 105 in the memory 103 as A[ ] and B[ ] are processed, i.e. multiplied. Both operands are n-words large (i.e. are vectors of n words). The product C[ ]=A[ ]*B[ ] is stored as 2n-word large array 106.

The word length (in bit) is denoted by w. The multiplication sign '*' is often omitted in the following for simplicity, i.e. A[ ]*B[ ]=A[ ]B[ ].

An integer A of length n can be represented by $N=\lceil n/w \rceil$ words. Let A[0] denoted the least significant word and let A[N−1] the most significant word (analogously for integers B and C).

The processor 102 includes a set of registers 107 in which it stores data on which it operates, for example one or more registers 108 for storing The processor 102 includes a register set 107 in which it stores data it operates on, e.g. one or more registers 108 for storing data (e.g. one or more words) of A, one or more registers 109 for storing data (e.g. one or more words) of B and one or more result registers (e.g. accumulators) 110 for storing and accumulating results of partial multiplications.

Figure 2:
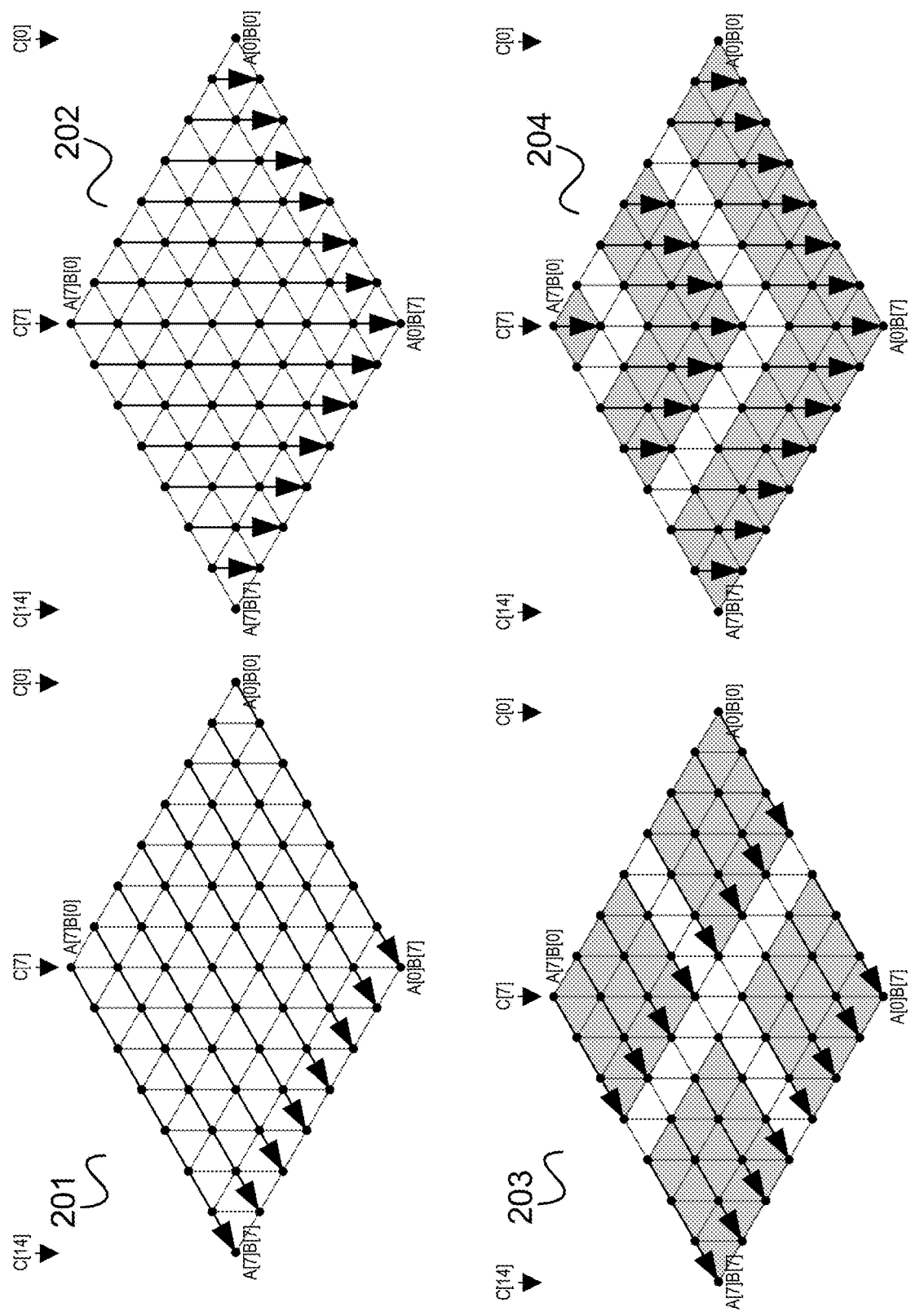
FIG. 2 shows four diagrams, each illustrating an approach for multiplication of two operands.

FIG. 2 shows four diagrams 201, 202, 203, 204, each illustrating an approach for multiplication of two operands.

The diagrams 201 to 204 illustrate the multiplication approaches for n=8. Each dot in the diagrams 201 to 204 represents a multiplication of words of the operands A and B. Arrows indicate the order in which the processor 102 performs partial multiplications one after the other.

The first diagram 201 illustrates the operand-scanning or schoolbook multiplication method. According to this multiplication approach, the processor 102 loads one operand word A[i] (into register set 107, e.g. a register 108) and multiplies A[i] with all B[j] (which are successively loaded to a register 109) before moving on to the next operand A[i+1]. The resulting product (for each A[i]) is added to the intermediate product C[ ] in memory 103.

The second diagram 202 illustrates product-scanning or column-wise multiplication method. According to this multiplication approach, all A[i] are multiplied with B[j] wherein the sum of i+j is kept constant. After summing up all intermediate products (for constant i+j, e.g. in an accumulator 110), the resulting C[i+j] is stored back to memory 103. Then the next column i+j+1 is processed.

The third diagram 203 illustrates the hybrid multiplication method which can be seen to combine the operand-scanning method and the product scanning method. Globally, it performs product scanning. Locally, it performs operand-scanning. While the product scanning reduces the number of necessary load instructions (i.e. loads to register set 107 from memory 103), the local operand-scanning is performed on the local registers 107 of a processor 102. The register set 107 stores a 2d+2 words large accumulator and a d-size operand. The other operand can be loaded to register set 107 and processed iteratively.

The fourth diagram 204 illustrates the operand-caching multiplication method. This method performs product-scanning locally and operand-scanning globally. It trades additional load/store (LD/ST) instructions for the more efficient use of the local register set 107. Only three words are needed for the accumulator 110 and 2e words are used to cache the processed operands (e being a design parameter).

The methods illustrated in FIG. 2 were designed to efficiently use an available register set 107 of a processor 102 in software. In hardware there is a similar challenge. The challenge is to reduce the number of memory accesses with registers, and consequently achieve the best performance, with a minimal number of added registers.

Figure 3:
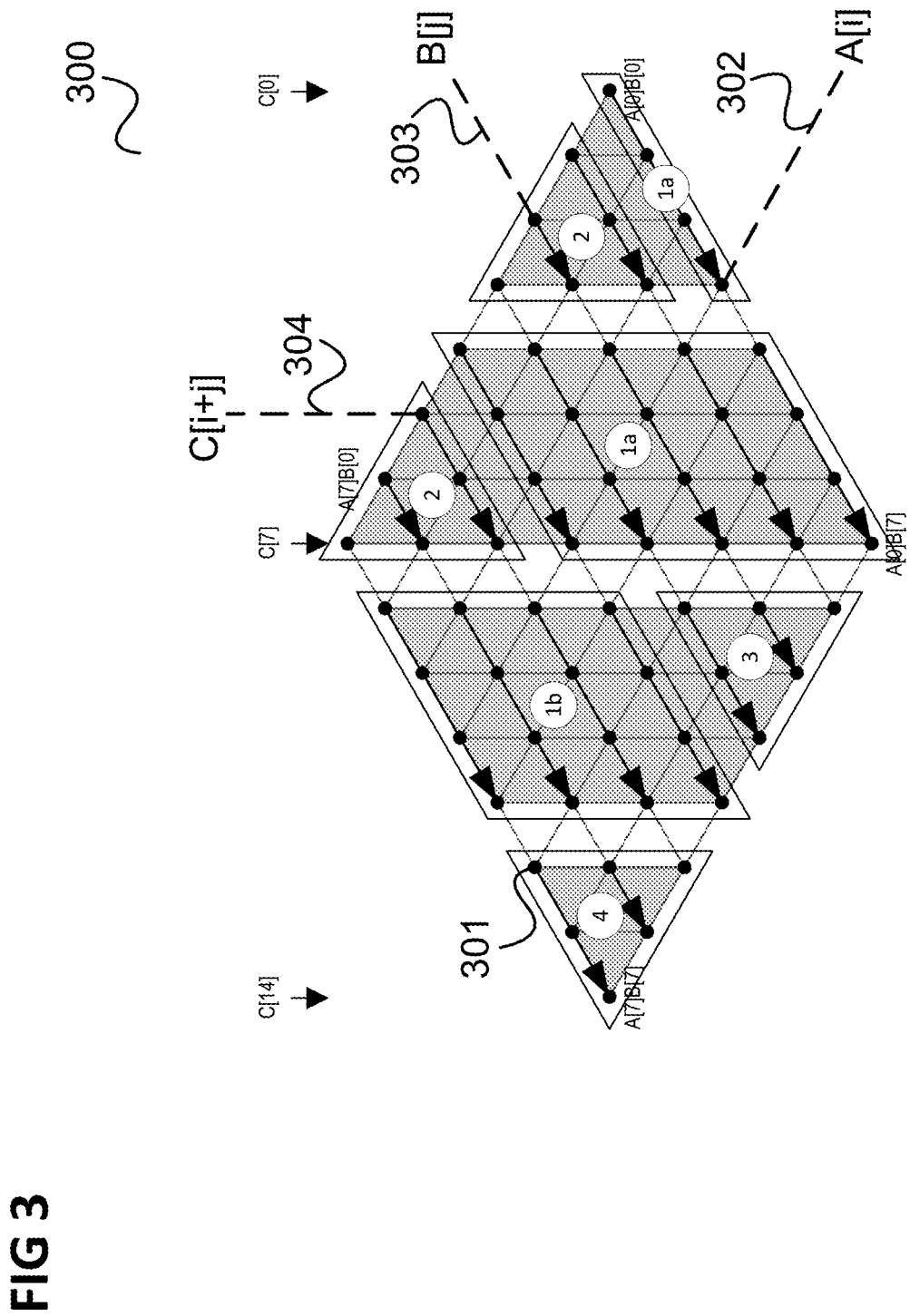
FIG. 3 shows a diagram illustrating a further multiplication method.

FIG. 3 shows a diagram 300 illustrating a further multiplication method.

Similarly to the diagrams of FIG. 2, the diagram 300 illustrates the multiplication approaches for n=8, each dot 301 represents a multiplication of words of the operands A and B and arrows indicate the order in which partial multiplications are performed one after the other.

In the form in the two-dimensional representation of the overall multiplication of FIG. 3, each "row" 302 (from top right to bottom left) corresponds to an A[i], each "diagonal" 304 corresponds to a B[j] and each "column" 304 corresponds to a C[i+j].

The multiplication method of FIG. 3 is denoted as parallel-product scanning. The parallel-product scanning performs globally product scanning and locally operand-scanning. In the local register-file 107, it keeps 2+f accumulator registers 110 and f operand registers 108, 109. It is assumed that each operand register 108, 109 and each accumulator register 110 stores one word.

From one processed operand A[i] to A[i+1], f−1 local registers of operand B[ ] can be re-used (and do not need to be fetched again from memory 103).

In FIG. 3, blocks of word multiplications 301 of three different base types are shown: block types 1 (with variants 1a and 1b), 2 and 3. The block type 1a occurs two times (a big and a small version) and the block type 2 occurs two times. The other block types occur only one time. It should be noted that FIG. 3 is a simple example with n=8. For higher n, the various block types may occur much more often.

It should be noted that the blocks form, from left to right, block columns, i.e., "vectors of blocks" (4), $$\binom{1b}{3}, \binom{2}{1a}, \binom{2}{1a}.$$

For example, to the right, a block of type 2 is above a block of type 1a. Block columns are similarly formed in case of higher dimensions.

The block types differ in their form. Accordingly, the operations carried out may be different for different blocks.

The blocks with the biggest performance impact are blocks 1a and 1b. They have a width of f=4 columns in the example of FIG. 3.

For each of the f columns, one A[i] (of the current row 302) is multiplied with the local B[j] (of the current diagonal 303) and added to the local accumulator 110 (for the current column 304). This happens independently from parallel product scanning. In other words, results of partial multiplications are accumulated taking the indices of the data words of the operands into account. This means that A[i]*B[j] for all pairs of i, j with i+j being constant need to be accumulated for the result data word C[i+j]. If the maximum value of the data word C[i+j] is exceeded the exceeding amount is carried over to the next data words C[i+j+1] and C[i+j+2].

According to one embodiment, the processor 102 processes the blocks from right to left and bottom to top, i.e. (small) block 1a, (right) block 2, (big) block 1a, (left) block 2, block 3, block 1b block 4. The processor 102 processes each of the blocks row-wise from bottom to top. From one row 302 to the next, f−1 words of B[ ] can be re-used. See for example (big) block 1a: in the bottom row, the leftmost B (which is B[7]) may not be re-used for the row above, while the others (B[6], B[5], B[4]) can. B[3] has to be loaded. In other words, B[7] is exchanged for B[3].

The difference between the blocks 1a and 1b is that while the processor 102 can start processing block 1b with already cached (i.e. loaded) words of B[ ], it needs to start the processing of the blocks 1a with loading all necessary words of B[ ]. In turn, the processor 102 finishes the processing of block 1b by storing the accumulated multiplications to C[ ] in the memory 103 in result array 106.

In the processing of blocks 2, the processor 102 stores the accumulated registers to the destination memory array for C[ ] 106. When the processor processes blocks 2, it still performs local operand-scanning, just processing shorter rows (e.g. in comparison to block 1a). As all necessary words of B[ ] are already available from the respective preceding block 1a, it does not need to fetch further words of B[ ]. Only additional words of A[ ] need to be fetched. In the end, there are only two accumulator registers 110 left over, i.e. still allocated, namely those storing the two most significant words of the result of processing block 2. Those two are forwarded (carried over) to the following block column (as the two least significant accumulator words).

At the start of block 3, only the two accumulator registers 110 storing the carried over words are allocated. At this point, according to one embodiment, there are sufficient registers available to load all A[i] and B[j] that are needed within block 3. Once the processor 102 has processed a row with an A[i], it can re-purpose the register 108 storing the A[i] as an additional accumulator register 110. From one row 302 to the next, the accumulator increases by one word register 110, until the accumulator finally requires f+2 words, i.e. includes f+2 accumulator registers 110 of one word each.

In all the multiplication methods illustrated in FIG. 2 and FIG. 3, word multiplications A[i]*B[j] are carried out. For this, the Chip 101 may for example include a w-bit-multiplier 111.

In a direct implementation, $N^2$ word multiplications are required for multiplying two integers According to various embodiments, a multiplication method is used which allows an asymptotic runtime enhancement of up to two with respect to conventional multiplication.

This speed-up can be achieved by dedicated hardware design which requires only little additional chip area: the w-bit-multiplier 111 is replaced by a w+1-bit-multiplier 111 and two w-bit-adders 112 are additionally included. This also holds in case of a software implementation (by emulating the behavior), if a multiplication in hardware takes longer than an addition.

To achieve the speed-up, the word multiplications A[i]*B[j] and A[j]*B[i] are combined by:

$$(A[i]+A[j])*(B[i]+B[j])=A[i]B[i]+A[i]B[j]+A[j]B[i]+A[j]B[j]$$

Namely, if considering for example the second diagram 202 of FIG. 2, it can be seen that each column (except for the first and the last) include word-multiplications A[i]*B[j] and A[j]*B[i]. Therefore, the sum of the word-multiplications over the column includes the sum A[i]B[j]+A[j]B[i].

Therefore, these two word-multiplications can be combined by the product (A[i]+A[j])*(B[i]+B[j]) by subtracting from the result of this product the word-products A[i]B[i] and A[j]B[j].

In the following, an example for an algorithm in two parts is given. The second part serves for subtracting the word-products A[i]B[i] which are generated in the first part of the algorithm. Note that ACC is at least three w-bit words wide.

```
Part 1:
   for col = 0..2*N−2
      for all i + j = col and i >= j
         if i != j
            ACC ← ACC + (A[i]+A[j])*(B[i]+B[j])
         else
            ACC ← ACC + 2*A[i]*B[i] = ACC + (A[i]+A[i])*(B[i] + 0)
      C[col] ← ACC[0]
      ACC ← ACC >> w
   C[2*N−1] ← ACC[0]
   C[2*N−2] ← ACC[1]
```

Part 1 generates the following result in memory for an example with N=4.

Each column corresponds (from right to left) a C[col] (from col=0 to 2N−1), i.e. indicates the word-multiplications which are accumulated in the respective C[col].

|  |  |  |  | A[0]B[3] | A[0]B[2] | A[0]B[1] | A[0]B[0] |
|---|---|---|---|---|---|---|---|
|  |  |  | A[1]B[3] | A[1]B[2] | A[1]B[1] | A[1]B[0] |  |
|  |  | A[2]B[3] | A[2]B[2] | A[2]B[1] | A[2]B[0] |  |  |
|  | A[3]B[3] | A[3]B[2] | A[3]B[1] | A[3]B[0] |  |  |  |
|  |  |  |  | A[0]B[0] | A[0]B[0] | A[0]B[0] | A[0]B[0] |
|  |  |  | A[1]B[1] | A[1]B[1] | A[1]B[1] | A[1]B[1] |  |
|  |  | A[2]B[2] | A[2]B[2] | A[2]B[2] | A[2]B[2] |  |  |
|  | A[3]B[3] | A[3]B[3] | A[3]B[3] | A[3]B[3] |  |  |  |

As can be seen, the C[col] include excess terms A[0]B[0], A[1]B[1], A[2]B[2], A[3]B[3]. Those are removed in the second part of the algorithm in O(n) operations.

```
Part 2:
   for col=0 . . . N−1
      ACC0←ACC0+A[col]*B[col]
      ACC1←ACC1+C[col]−ACC0
      C[col]←ACC1[0]
      ACC1←ACC1>>w
   for col=N . . . 2*N−2
      ACC0←ACC0−A[col−N]*B[col−N]
      ACC1←ACC1+C[col]−ACC0
      C[col]←ACC1[0]
      ACC1←ACC1>>w
   C[2*N−1] ACC1+C[2*N−1]−ACC0
```

In the above pseudo-code, an arrow '←' denotes assigning the value of the right-hand side to the left-hand side and >> denotes a shift to the right (of the operand on the left-hand side by the amount specified on the right-hand side).

The two parts 1 and 2 can be combined to a single algorithm. This allows updating two accumulators ACC0 and ACC1 simultaneously and reduce the accesses to C[col] to a minimum.

Combined Algorithm

```
for col = 0..2*N−2
    for all i + j = col and i>=1
        if i != j
            ACC0 ← ACC0 + (A[i]+A[j])*(B[i]+B[j])
        else
            ACC0 ← ACC0 + 2*A[i]*B[i]
    if col <= N−1
        ACC1 ← ACC1 + A[col]*B[col]
        ACC0 ← ACC0 − ACC1
    if col >= N−1
        ACC1 ← ACC1 − A[col−N+1]*B[col−N+1]
    C[col] ← ACC0[0]
    ACC0 ← ACC0 >> w
C[2*N−1] ← ACC0[0]
```

It should be noted that the multiplications related to ACC1 do not require separate load operations. Those multiplications can be performed right next to the multiplications related to ACC0 in which the same operands are processed.

Figure 4:
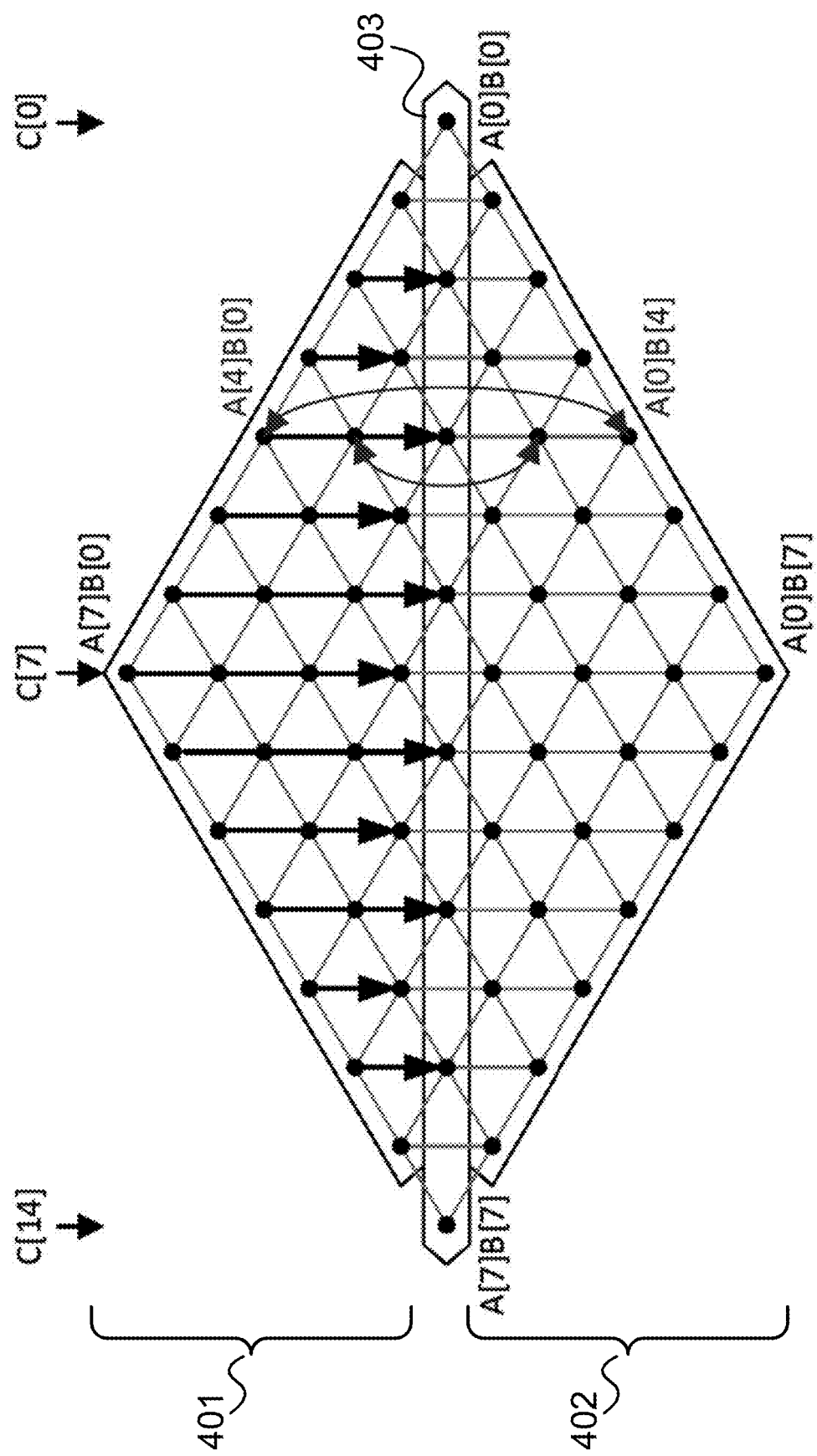
FIG. 4 illustrates the multiplication method described above in the way of FIG. 2 and FIG. 3.

FIG. 4 illustrates the multiplication method described above in the way of FIG. 2 and FIG. 3.

Each multiplication A[j]B[i] in the lower half 402 is performed together with the multiplication A[i]B[j] in the upper half 401, for example A[0]B[4] with A[4]B[0] by, as described above calculating (A[i]+A[j])*(B[i]+B[j]) (and correcting it afterwards). As indicated by arrows the algorithm thus passes through each column only until it has reached the middle region 403 which includes the multiplications A[i]*B[i].

The upper half 401 includes $(N-1)N/2=N^2-N/2$ multiplications. The middle region 403 includes N multiplications which are performed twice. Thus, the multiplication method described requires $N^2/2+3N/2$ in total. As mention above, conventional product scanning requires $N^2$ multiplications.

The multiplication method described and product scanning both require $N^2$ load operations as well as 2N store operation.

The multiplication method described thus does not reduce the number of load operations required. This may be addressed by enhancing the memory bandwidth or by using an algorithm which reduces the number of memory accesses.

Figure 5:
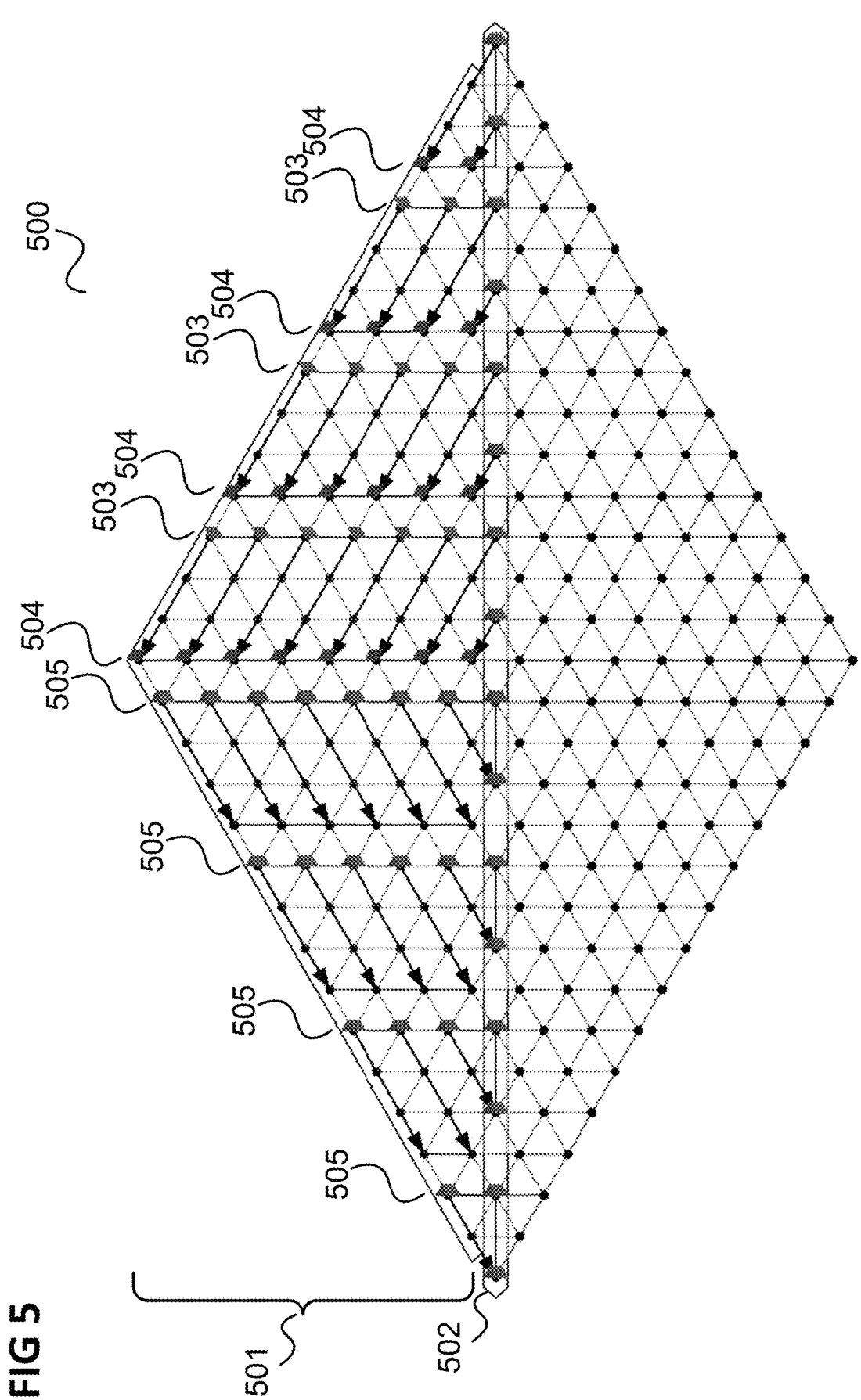
FIG. 5 illustrates a combination of the multiplication method described with parallel product scanning as it is described with reference to FIG. 3.

FIG. 5 illustrates a combination of the multiplication method described with parallel product scanning as it is described with reference to FIG. 3.

In the upper half 501 the operand A[ ] is loaded in the columns 503, the operand B[ ] is loaded in the column 504 and both are loaded in the columns 505. In the middle region 502, both are always loaded.

The block columns are processed from top to bottom (i.e. the arrows arranged in a column are processed from top to bottom).

Figure 6:
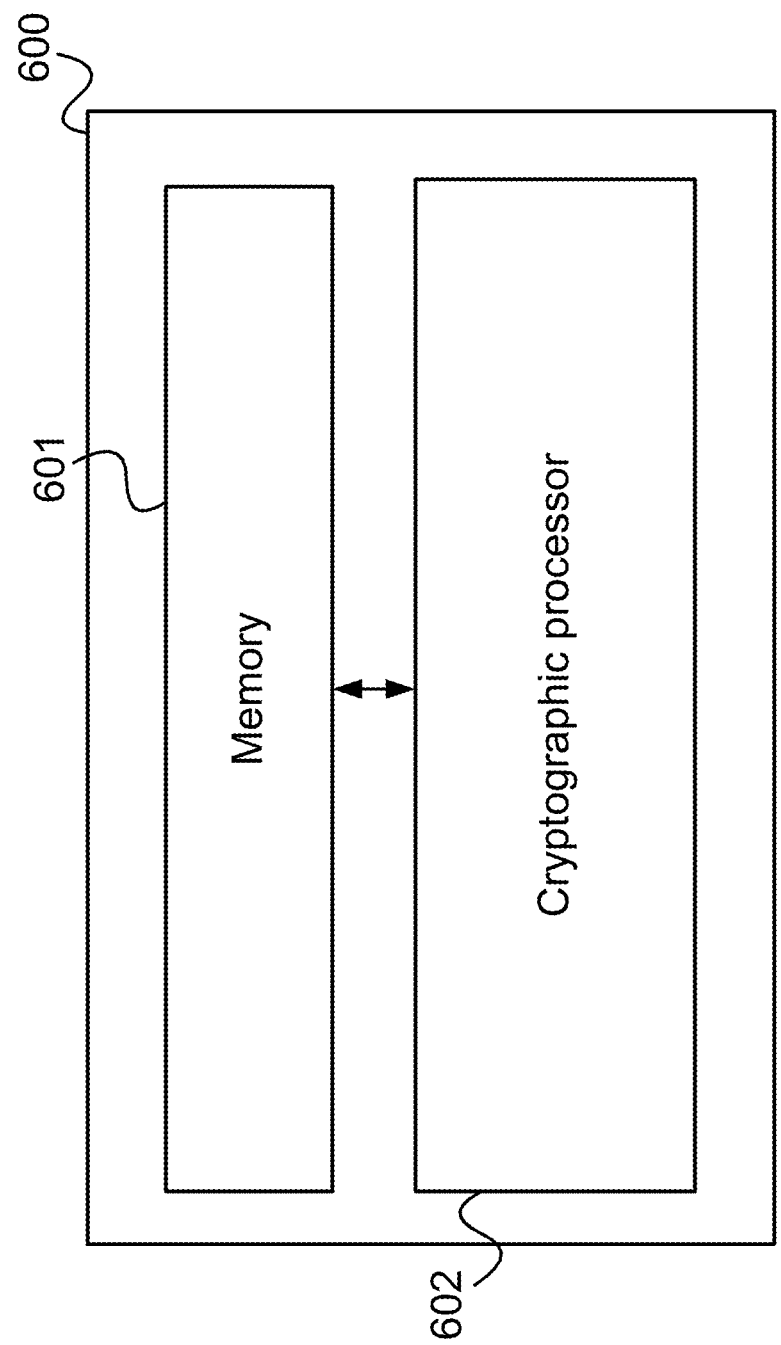
FIG. 6 shows a cryptographic processing device according to an embodiment.

In summary, according to various embodiments, a cryptographic processing device is provided as illustrated in FIG. 6.

FIG. 6 shows a cryptographic processing device 600 according to an embodiment.

The cryptographic processing device 600 includes a memory 601 configured to store a first operand and a second operand represented by data to be cryptographically processed, wherein the first operand and the second operand each include a data word for each operand word index in an operand word index range.

The cryptographic processing device 600 further includes a cryptographic processor 602 configured to determine, for cryptographically processing the data, the product of the first operand with the second operand by determining, for each result word index in a result word index range, a result data word for the result word index.

The cryptographic processor does this by accumulating, over all pairs of a first operand word index and a second operand word index with the first operand word index being bigger than the second operand word index and the sum of the first operand word index and the second operand word index being equal to the result word index the products of
  the sum of the word of the first operand for the first operand word index and the word of the first operand for the second operand word index with
  the sum of the word of the second operand for the first operand word index and the word of the second operand for the second operand word index,
by adding (to the result of the accumulation), if the result word index is even two times the product of the word of the first operand having the operand word index equal to half the result word index and the word of the second operand having the operand word index equal to half the result word index,
by, if there is a positive carry from a result data word of a lower index than the result word index to the result data word, adding the carry, and, if there is a negative carry from a result data word of a lower index than the result word index to the result data word, subtracting the carry (i.e. by taking into account a possible carry) and
by subtracting (from the result of the accumulation plus, if applicable, the addition), for each first operand word index occurring in the pairs over which the cryptographic processor performs the accumulation for the result word index, the product of the first operand word with the first operand word index and the second operand word with the first operand word index.

According to various embodiments, in other words, a cryptographic processing device determines the product of two multi-word operands by determining, for each result word index in a result word index range, a result data word by accumulating products of sums of words of the first operand and the second operand and subtracting excess terms arising in the accumulation.

It should be noted that the carry from one result data word to another result data word may include more than one bit.

Figure 7:
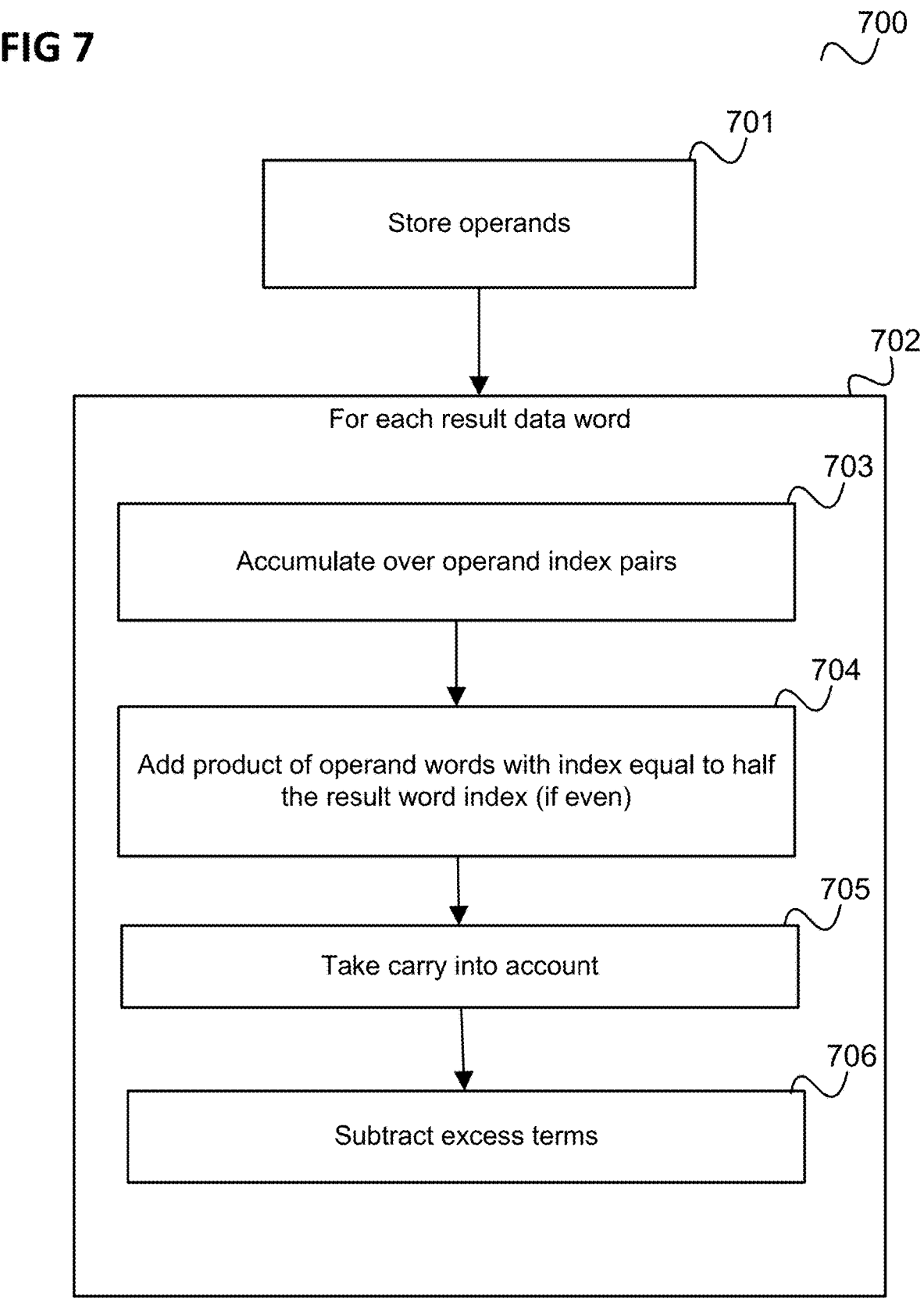
FIG. 7 shows a flow diagram illustrating a method for cryptographically processing data.

According to various embodiments, a method is provided as illustrated in FIG. 7.

FIG. 7 shows a flow diagram 700 illustrating a method for cryptographically processing data.

In 701, storing a first operand and a second operand represented by data to be cryptographically processed are stored. The first operand and the second operand each include a data word for each operand word index in an operand word index range.

In 702 for cryptographically processing the data, the product of the first operand with the second operand is determined by determining, for each result word index in a result word index range, a result data word for the result word index.

This is performed by
  in 703, accumulating, over all pairs of a first operand word index and a second operand word index with the first operand word index being bigger than the second operand word index and the sum of the first operand word index and the second operand word index being equal to the result word index the products of the sum of the word of the first operand for the first operand word index and the word of the first operand for the second operand word index with the sum of the word of the second operand for the first operand word index and the word of the second operand for the second operand word index;

in 704, adding, if the result word index is even two times the product of the word of the first operand having the operand word index equal to half the result word index and the word of the second operand having the operand word index equal to half the result word index in 705, if there is a positive carry from a result data word of a lower index than the result word index to the result data word, adding the carry, and, if there is a negative carry from a result data word of a lower index than the result word index to the result data word, subtracting the carry; and in 706 subtracting, for each first operand word index occurring in the pairs over which the cryptographic processor performs the accumulation for the result word index, the product of the first operand word with the first operand word index and the second operand word with the first operand word index.

It should be noted that 703 to 706 do not have necessarily be performed in the order shown in FIG. 7. In particular, for example, taking into account a possible carry (which may be negative or positive) can happen at a different stage, e.g. right in the beginning or in the end.

Various Examples are described in the following:

Example 1 is a cryptographic processing device as illustrated in FIG. 6.

Example 2 is the cryptographic processing device of Example 1, wherein the cryptographic processor includes a further accumulator and is configured to accumulate, as a further accumulation, by means of the second accumulator, the products of the first operand word with the first operand word index and the second operand word with the first operand word index over all first operand word index occurring in the pairs over which the cryptographic processor performs the accumulation and is configured to subtract the result of the further accumulation from the result of the accumulation and the adding.

Example 3 is the cryptographic processing device of Example 2, wherein the cryptographic processor is configured to determine the result of the further accumulation for a result word from the result of the further accumulation for the previous result word according to a determination order of the result words.

Example 4 is the cryptographic processing device according to any one of Examples 1 to 3, wherein the data includes data to be decrypted or to be encrypted, a cryptographic key, data for a cryptographic key exchange and/or a cryptographic signature.

Example 5 is the cryptographic processing device of any one of Examples 1 to 4, wherein the cryptographic processing device is configured to derive the first operand and the second operand from the data to be cryptographically processed.

Example 6 is the cryptographic processing device of any one of Examples 1 to 5, further including an input configured to receive at least a part of the data to be cryptographically processed.

Example 7 is the cryptographic processing device of Example 6, wherein the input is configured to receive at least a part of the data via a communication network connection.

Example 8 is a method for cryptographically processing data as illustrated in FIG. 7.

Example 9 is the method of Example 8, including accumulating, as a further accumulation the products of the first operand word with the first operand word index and the second operand word with the first operand word index over all first operand word index occurring in the pairs over which the cryptographic processor performs the accumulation and subtracting the result of the further accumulation from the result of the accumulation and the adding.

Example 10 is the method of Example 9, including determining the result of the further accumulation for a result word from the result of the further accumulation for the previous result word according to a determination order of the result words.

Example 11 is the method according to any one of Examples 8 to 10, wherein the data includes data to be decrypted or to be encrypted, a cryptographic key, data for a cryptographic key exchange and/or a cryptographic signature.

Example 12 is the method of any one of Examples 8 to 11, including deriving the first operand and the second operand from the data to be cryptographically processed.

Example 13 is the method of any one of Examples 8 to 12, further including receiving at least a part of the data to be cryptographically processed.

Example 14 is the method of Example 13, including receiving at least a part of the data via a communication network connection.

According to various embodiments, a cryptographic processing device is provided including storing means for storing a first operand and a second operand represented by data to be cryptographically processed, wherein the first operand and the second operand each include a data word for each operand word index in an operand word index range; determining, for cryptographically processing the data, the product of the first operand with the second operand, determining means for determining, for each result word index in a result word index range, a result data word for the result word index by accumulating, over all pairs of a first operand word index and a second operand word index with the first operand word index being bigger than the second operand word index and the sum of the first operand word index and the second operand word index being equal to the result word index the products of the sum of the word of the first operand for the first operand word index and the word of the first operand for the second operand word index with the sum of the word of the second operand for the first operand word index and the word of the second operand for the second operand word index and adding, if the result word index is even two times the product of the word of the first operand having the operand word index equal to half the result word index and the word of the second operand having the operand word index equal to half the result word index, if there is a positive carry from a result data word of a lower index than the result word index to the result data word, adding the carry, if there is a negative carry from a result data word of a lower index than the result word index to the result data word, subtracting the carry and subtracting, for each first operand word index occurring in the pairs over which the cryptographic processor performs the accumulation for the result word index, the product of the first operand word with the first operand word index and the second operand word with the first operand word index.

The cryptographic processing device according to any one of the examples described above may be implemented in software (i.e. by means of a processor executing a software) or in hardware (i.e. by a hard-wired hardware circuit, possibly controlled by firmware or the like).

In particular, the cryptographic processing device may be implemented by one or more circuits, wherein a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program. Any other kind of implementation of the respective functions which are described herein may also be understood as a "circuit" in accordance with an alternative embodiment.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS 101 chip
102 processor
103 memory
104, 105 operands
106 result
107 register set
108-110 register
111 multiplier
112 adder
201-204 multiplication diagrams
300 multiplication diagram
301 partial multiplication
302 row
303 diagonal
304 column
401 upper half
402 lower half
403 middle region
501 upper half
502 middle regions
503-505 columns
600 cryptographic processing device
601 memory
602 cryptographic processor
700 flow diagram
701-706 processing

What is claimed is:

1. A cryptographic processing device comprising:
a memory configured to store a first operand and a second operand represented by data to be cryptographically processed, wherein the first operand and the second operand each comprise a data word for each operand word index in an operand word index range; and
a cryptographic processor configured to determine, for cryptographically processing the data, the product of the first operand with the second operand by determining, for each result word index in a result word index range, a result data word for the result word index by accumulating, over all pairs of a first operand word index and a second operand word index with the first operand word index being bigger than the second operand word index and the sum of the first operand word index and the second operand word index being equal to the result word index the products of
 the sum of the word of the first operand for the first operand word index and the word of the first operand for the second operand word index with the sum of the word of the second operand for the first operand word index and the word of the second operand for the second operand word index
adding, if the result word index is even, two times the product of the word of the first operand having the operand word index equal to half the result word index and the word of the second operand having the operand word index equal to half the result word index;
if there is a positive carry from a result data word of a lower index than the result word index to the result data word, adding the carry;
if there is a negative carry from a result data word of a lower index than the result word index to the result data word, subtracting the carry; and
subtracting, for each first operand word index occurring in the pairs over which the cryptographic processor performs the accumulation for the result word index, the product of the first operand word with the first operand word index and the second operand word with the first operand word index.

2. The cryptographic processing device of claim 1, wherein the cryptographic processor comprises a further accumulator and is configured to accumulate, as a further accumulation, by means of the second accumulator, the products of the first operand word with the first operand word index and the second operand word with the first operand word index over all first operand word index occurring in the pairs over which the cryptographic processor performs the accumulation and is configured to subtract the result of the further accumulation from the result of the accumulation and the adding.

3. The cryptographic processing device of claim 2, wherein the cryptographic processor is configured to determine the result of the further accumulation for a result word from the result of the further accumulation for the previous result word according to a determination order of the result words.

4. The cryptographic processing device according to claim 1, wherein the data comprises data to be decrypted or to be encrypted, a cryptographic key, data for a cryptographic key exchange and/or a cryptographic signature.

5. The cryptographic processing device of claim 1, wherein the cryptographic processing device is configured to derive the first operand and the second operand from the data to be cryptographically processed.

6. The cryptographic processing device of claim 1, further comprising an input interface configured to receive at least a part of the data to be cryptographically processed.

7. The cryptographic processing device of claim 6, wherein the input interface is configured to receive at least a part of the data via a communication network connection.

8. A method for cryptographically processing data comprising:
- storing a first operand and a second operand represented by data to be cryptographically processed, wherein the first operand and the second operand each comprise a data word for each operand word index in an operand word index range;
- determining, for cryptographically processing the data, the product of the first operand with the second operand by determining, for each result word index in a result word index range, a result data word for the result word index by
- accumulating, over all pairs of a first operand word index and a second operand word index with the first operand word index being bigger than the second operand word index and the sum of the first operand word index and the second operand word index being equal to the result word index
- the products of
  - the sum of the word of the first operand for the first operand word index and the word of the first operand for the second operand word index with
  - the sum of the word of the second operand for the first operand word index and the word of the second operand for the second operand word index
- adding, if the result word index is even two times the product of the word of the first operand having the operand word index equal to half the result word index and the word of the second operand having the operand word index equal to half the result word index; and
- subtracting, for each first operand word index occurring in the pairs over which the cryptographic processor performs the accumulation for the result word index, the product of the first operand word with the first operand word index and the second operand word with the first operand word index.

9. The method of claim 8, further comprising accumulating, as a further accumulation the products of the first operand word with the first operand word index and the second operand word with the first operand word index over all first operand word index occurring in the pairs over which the cryptographic processor performs the accumulation and subtracting the result of the further accumulation from the result of the accumulation and the adding.

10. The method of claim 8, further comprising determining the result of the further accumulation for a result word from the result of the further accumulation for the previous result word according to a determination order of the result words.

11. The method of claim 8, wherein the data includes data to be decrypted or to be encrypted, a cryptographic key, data for a cryptographic key exchange and/or a cryptographic signature.

12. The method of claim 8, further comprising deriving the first operand and the second operand from the data to be cryptographically processed.

13. The method of claim 8, further comprising receiving at least a part of the data to be cryptographically processed.

14. The method of claim 8, further comprising receiving at least a part of the data via a communication network connection.

* * * * *